United States Patent [19]
Cidon et al.

[11] Patent Number: 5,446,737
[45] Date of Patent: Aug. 29, 1995

[54] METHOD AND APPARATUS FOR DYNAMICALLY ALLOCATING SHARED RESOURCE ACCESS QUOTA

[75] Inventors: Israel Cidon, Bronx; Leonidas Georgiadis, Chappaqua; Roch A. Guerin, Yorktown Heights, all of N.Y.; Yuval Y. Shavitt, Technion City, Israel; Andrew E. Slater, Yorktown Heights, N.Y.

[73] Assignee: International Business Machines Corporation, Armonk, N.Y.

[21] Appl. No.: 192,464

[22] Filed: Feb. 7, 1994

[51] Int. Cl.⁶ .............................................. H04J 3/16
[52] U.S. Cl. ................................. 370/85.5; 370/85.15; 370/85.12; 340/825.05
[58] Field of Search ................. 370/79, 84, 85.8, 95.2, 370/95.3, 85.6, 94.1, 85.1, 85.9, 85.11, 85.12, 85.15, 85.5; 340/825.5, 825.51, 825.05

[56] References Cited

U.S. PATENT DOCUMENTS

| | | | |
|---|---|---|---|
| 4,926,418 | 5/1990 | Cidon et al. | 370/85.5 |
| 4,977,557 | 12/1990 | Phung et al. | 370/85.6 |
| 5,001,707 | 3/1991 | Kositpaiboon et al. | 370/94.1 |
| 5,072,443 | 12/1991 | Hahne et al. | 370/85.9 |
| 5,111,456 | 5/1992 | Limb | 370/85.9 |
| 5,124,981 | 6/1992 | Golding | 370/85.9 |
| 5,128,937 | 7/1992 | Khalil | 370/85.9 |

*Primary Examiner*—Douglas W. Olms
*Assistant Examiner*—Ajit Patel
*Attorney, Agent, or Firm*—Heslin & Rothenberg

[57] ABSTRACT

A counter for tracking current shared resource access quota requests of nodes in a multi-node system is circulated among the nodes. A quota for a given node is determined as a function of the counter, the needs of the given node and a variable indicative of total access quota for all nodes combined. The determined quota is then allocated to the given node, i.e., the node is allowed to access the shared resource in accordance with the determined quota.

35 Claims, 3 Drawing Sheets

METHOD AND APPARATUS FOR DYNAMICALLY ALLOCATING SHARED RESOURCE ACCESS QUOTA

BACKGROUND OF THE INVENTION

1. Technical Field

The present invention generally relates to multi-node communication systems with shared resources. More particularly, the present invention relates to allocation of shared resource access quota in multi-node communication systems.

2. Background Art

In the past, multi-node communication systems, such as local area networks, including both ring networks and bus networks, have attempted to manage node access to shared resources by setting a predetermined limit on the amount of resources allocated to any one node. Although several different mechanisms exist to accomplish this, including polling, random access, time slot and quota allocation mechanisms, the present invention will focus on quota allocation mechanisms.

Once a node has exhausted its quota, existing quota allocation schemes generally do not allow it to transmit again until all the other nodes have exhausted their quota, at which time the quotas are refreshed. While such a quota scheme guarantees an equitable access to the shared resources, the fixed quota size may lead to either underutilization of the system or to long access delays. If the fixed quota is too small, the system may be underutilized since the nodes may deplete their quota while waiting for the quota refresh signal to propagate through the system. Thus, nodes may be idle for an extended time relative to the transmission time. On the other hand, if the fixed quota is too large and the system is heavily loaded by one or a few nodes, some nodes may have a long access delay proportional to the number of active nodes before gaining access to the shared resource. In existing schemes, the fixed quota is set at some level between the two extremes. One such fixed quota allocation scheme is disclosed in U.S. Pat. No. 4,926,418 issued to Cidon et al. and assigned to IBM (hereinafter, "the Cidon patent"), the disclosure of which is herein incorporated by reference in its entirety.

Shared resource access control mechanisms can be either distributed or centralized. A centralized access control mechanism requires a dedicated node to act as the controller for receiving access requests and granting and managing access allocations to the other nodes. A distributed access control mechanism distributes these responsibilities among the nodes and does not require a dedicated node, and is, therefore, less complex than a centralized access control mechanism.

Thus, a need exists for a distributed quota allocation mechanism that can adapt to changing load conditions.

SUMMARY OF THE INVENTION

Briefly, the present invention satisfies the need for an adaptive quota allocation mechanism by providing a method and apparatus for dynamic and distributed quota allocation to a given node based on its quota needs, the quota needs of the other nodes and a value indicative of total access quota for all nodes in the system.

A method for dynamically determining shared resource access quota in a communication system including a plurality of nodes is disclosed. A quota request counter is circulated among the plurality of nodes. The quota request counter indicates current total node requests among all nodes for shared resource access quota. A shared resource access quota is determined for a given node as a function of the quota request counter, a quota request of the given node and a total access quota for all nodes in the system. The shared resource access quota may be determined based on the following formula:

$$QUOTA_i = Qmax * (Req_i / REQtot),$$

where:
 $QUOTA_i$ = shared resource access quota for node i,
 Qmax = total access quota for all nodes combined,
 $Req_i$ = quota request of node i,
and
 REQtot = quota request counter.

The present invention also employs a method for allocating shared resource access quota in a communication system including a plurality of nodes. In addition to the steps of the basic determination method above, the step of allocating the determined shared resource access quota to the given node is performed. The allocation step may be accomplished by circulating a quota allocation signal among the nodes and granting the determined shared resource access quota to a given node in response to the quota allocation signal.

Further, the present invention includes allocating a predetermined shared resource access quota to a given node in response to a quota allocation signal if the given node requested zero quota.

Still further, the present invention includes a multi-node communication system with a shared resource implementing the methods disclosed herein.

These, and other aspects, features and advantages of this invention will become apparent from the following detailed description of the various aspects of the invention taken in conjunction with the accompanying drawings.

BEST MODE FOR CARRYING OUT THE INVENTION

Figure 1:
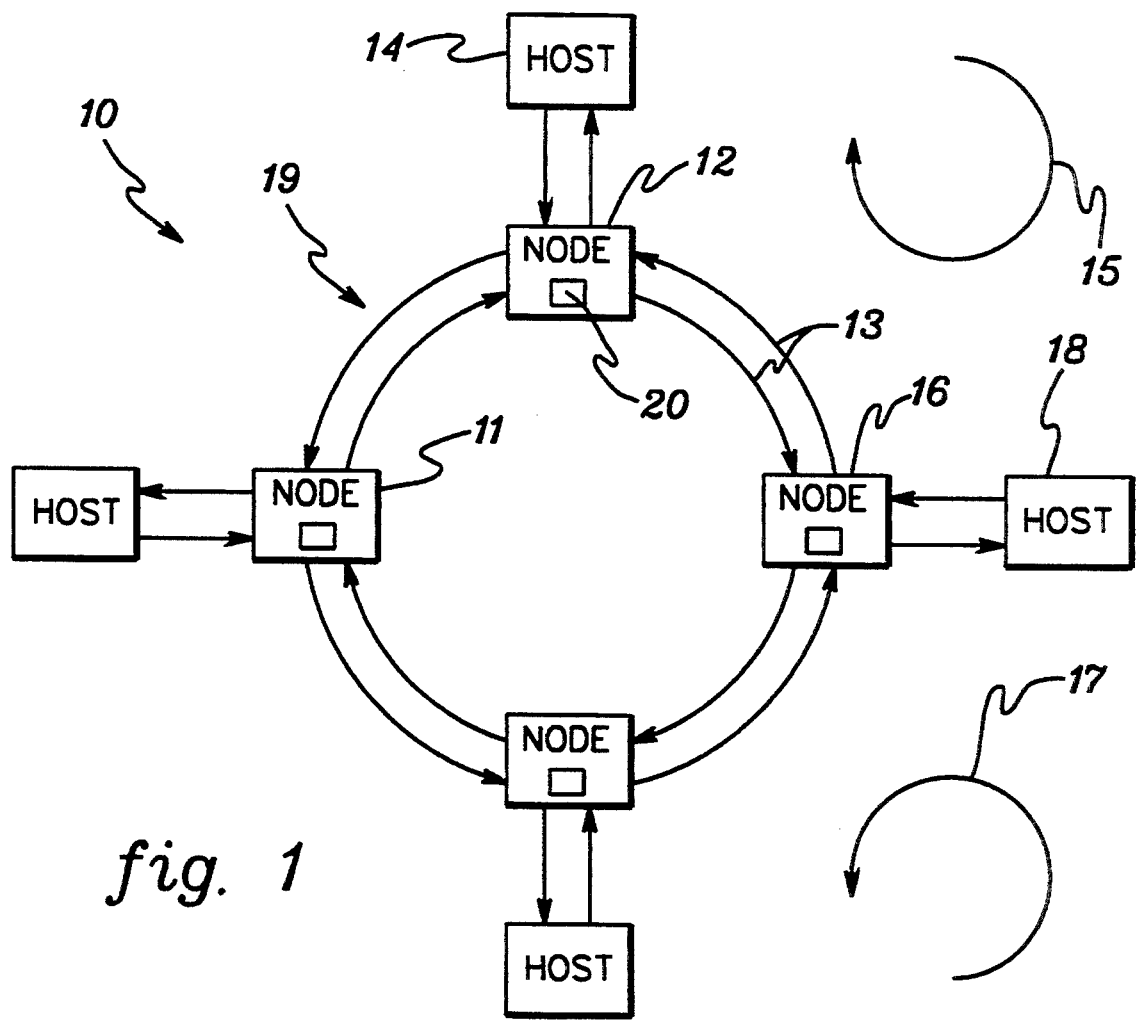
FIG. 1 is a block diagram of a portion of a four-node bidirectional communication system according to the present invention.

FIG. 1 is a block diagram depicting a bidirectional multi-node communication system 10 according to the present invention. The exemplary system of FIG. 1 is of a buffer insertion ring architecture employing spatial reuse, that is, a ring where multiple simultaneous transmissions are allowed as long as they take place over different links. System 10 comprises bidirectional ring 19, including clockwise ring 15 and counterclockwise ring 17. Between nodes are duplex links, e.g., link 13. As is known in the art, each node, e.g., node 12, is associated with a host, here, host 14, and serves as an interface between that host and other hosts. Each node comprises a quota allocator, e.g., quota allocator 20 in node 12, which determines a shared resource access quota, and allocates the determined quota to its associated node in response to a signal hereinafter referred to as the "SAT" signal. Further details regarding the SAT signal can be found in the Cidon patent. A node with quota and information to transmit, does so along the shortest path of either ring. A separate set of SAT and REQtot signals (the REQtot signal will subsequently be explained) circulate on each ring and control information traffic on the opposite ring, however, the following description focuses on one set of signals, it being understood that the operational description is similar for the other set.

A REQtot signal travels among the nodes in a predetermined direction, depending on the ring, and indicates the total quota requests of all nodes in system 10 in the current quota determination cycle. The current quota determination cycle is defined as the time between consecutive visits of the REQtot signal to a given node. The REQtot signal could be appended to the SAT signal or could be separate therefrom. It has been found that separating the signals is more efficient, since REQtot circulates among the nodes faster than the SAT and therefore REQtot will more closely reflect the actual current quota needs of the nodes. The SAT travels slower, since a given node with quota remaining from the last SAT visit may hold the SAT, postponing the allocation of new quota thereto until the left over quota is exhausted.

Figure 2:
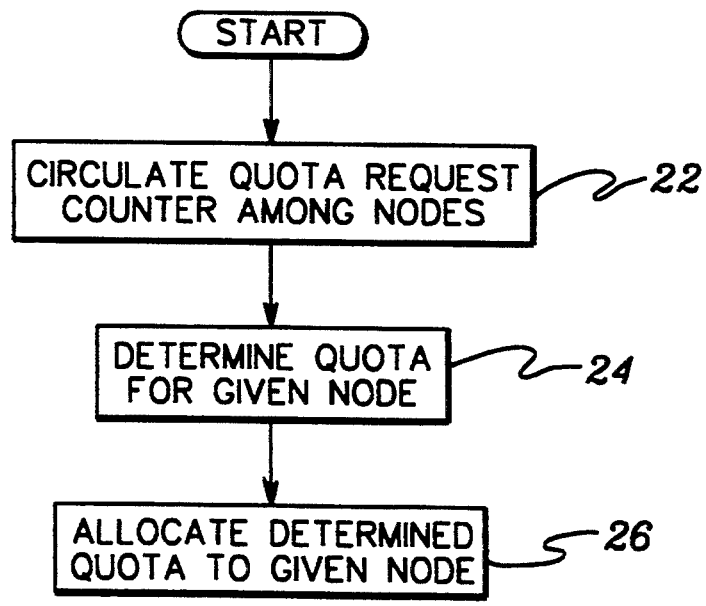
FIG. 2 is a flow diagram of a basic method for dynamically allocating shared resource access quota according to the present invention.

FIG. 2 is a flow diagram of a basic method for dynamically allocating shared resource access quota according to the present invention. The method of FIG. 2 will now be described with reference to the multi-node communication system 10 of FIG. 1. The method includes circulating the quota request counter (REQtot) among the nodes of system 10 (STEP 22, CIRCULATE QUOTA REQUEST COUNTER AMONG NODES). The basic method also includes determining a shared resource access quota for a given node as a function of REQtot, a quota request of that given node (hereinafter, "Req") and a predetermined total access quota for all nodes in the system (hereinafter, "Qmax") (STEP 24, DETERMINE QUOTA FOR GIVEN NODE). Finally, the basic allocation method requires allocation of the determined quota to the given node, i.e., allowing node 12 to access the shared resource (here, bidirectional ring 19) in accordance with the determined shared resource access quota (STEP 26, ALLOCATE DETERMINED QUOTA TO GIVEN NODE).

In order to keep REQtot current, it is updated to reflect changes in the quota requests of the nodes. This updating of REQtot could be done either upon arrival of REQtot at a given node, or upon leaving that node. At a given node, the updating may take the form of adjusting REQtot based on a change in the quota request of that node from the previous quota determination cycle. In the simplest form, the updating of REQtot could be accomplished by subtracting from REQtot the quota request of that node from the previous cycle and adding the current cycle request thereto. The simple form assumes that the previous quota request was saved in local memory.

The step of determining a shared resource access quota for a given node (hereinafter, "QUOTA"), STEP 24 in FIG. 2, is triggered by either the leaving of REQtot or the receipt of the SAT signal at a given node and preferably utilizes the following formula:

$$QUOTA = Qmax*(Req/REQtot).$$

Qmax is the predetermined total access quota for all nodes in the system. Qmax could, for example, designate a transmission time, or, as another example, could designate an amount of information, such as kilobytes. Req is a quota request of a given node (here, node 12). Req may be a quota request of a given node from the last visit of REQtot, or it could be the current quota request of that node. In addition, Req could be altered to reflect a priority assigned to a given node. Req may take the form of a transmission time or information amount, or it could simply indicate whether a node requests zero or nonzero quota.

In the situation where a node was not able to exhaust its quota between visits of the SAT signal, due to traffic on the ring, that node is preferably allowed to exhaust the old QUOTA before allocating the newly determined QUOTA. In addition, where a node "changes its mind" regarding the quota it requires, it may be desirable to allow that node to change its previous quota request (Req). For example, if a system determines QUOTA on the Req of a node from the previous quota determination cycle, then that Req was really an educated guess by the node as to its quota requirements in the near future. If that previous Req was zero, but the current quota request is nonzero, it may be desirable to allow the node to substitute the nonzero request for the previous Req in determining QUOTA. As another example, if the prior Req was zero and the current request is nonzero, a predetermined minimum quota may be allocated thereto. As still another example, if the current request is less than the previous Req, it would improve efficiency to substitute the current request. Finally, in some situations, it may be desirable to ensure that a particular node is not restricted by changes in its quota requirements by allowing that node to always substitute its current request for the prior one.

The situation often exists in multi-node systems where a node requests no quota. In that situation, it may be more efficient to determine a quota for the other nodes and to assign a minimum quota to the node requesting no quota. In other words, all nodes are guaranteed at least a minimum quota, even if they are not currently requesting any, since access needs may change at any time for a given node. The assigned quota could be the same for any node requesting no quota, or different for different nodes. While REQtot is still circulated to all nodes, the node requesting no quota could be, for example, merely assigned a predetermined quota without actually going through the quota determination. As another example, a predetermined quota could be substituted for the zero quota request of the node in the quota determination, however, the actual quota determined would also naturally depend on the requests of the other nodes.

Figure 3:
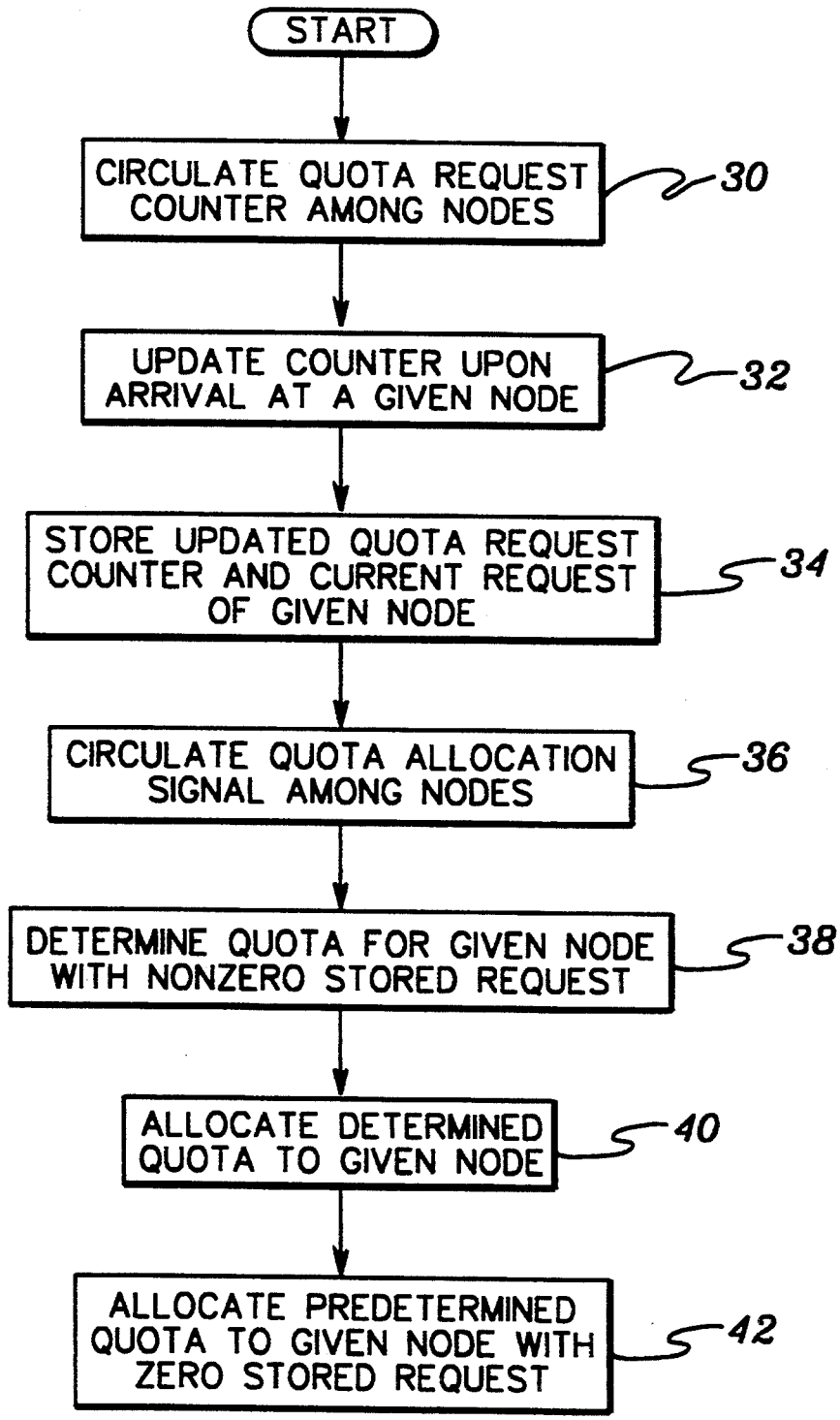
FIG. 3 is a flow diagram of a more detailed aspect of the method depicted in FIG. 2.

FIG. 3 is a flow diagram of a method of dynamically allocating shared resource access quota in a multi-node system where a particular node requests no quota. As before, REQtot is circulated among the nodes (STEP 30, CIRCULATE QUOTA REQUEST COUNTER AMONG NODES). Upon receipt of REQtot at a given node, REQtot is updated (STEP 32, UPDATE COUNTER UPON ARRIVAL AT A GIVEN NODE). The updated REQtot and the current quota request of the given node are stored in local memory (STEP 34, STORE UPDATED QUOTA REQUEST COUNTER AND CURRENT REQUEST OF GIVEN NODE). A quota allocation signal (i.e., the SAT signal here) is also circulated among all the nodes, preferably in the direction opposite the information traffic it regulates, where possible (STEP 36, CIRCULATE QUOTA ALLOCATION SIGNAL AMONG NODES). Upon arrival of the SAT at a node with a nonzero stored quota request, a QUOTA is determined therefor (STEP 38, DETERMINE QUOTA FOR GIVEN NODE WITH NONZERO STORED REQUEST) and allocated thereto when the quota allocation signal leaves that node (STEP 40, ALLOCATE DETERMINED QUOTA TO GIVEN NODE). Finally, upon release of the SAT at a given node with a zero stored request, a predetermined quota is allocated thereto, the predetermined quota being equal to the assigned request used to update REQtot (STEP 42, ALLOCATE PREDETERMINED QUOTA TO GIVEN NODE WITH ZERO STORED REQUEST).

As an alternative to STEP 38 of FIG. 3, a QUOTA could be determined for a node when the quota counter leaves, instead of upon arrival of the SAT signal. In addition, REQtot is preferrably updated in the following manner. At a node with a current nonzero quota request, REQtot is updated to reflect changes in that node's quota request from the last visit of REQtot thereto. At a given node with a current zero quota request, REQtot may either be updated to reflect a predetermined assigned quota request as if it were the current request of that node or REQtot may be left unchanged.

Figure 4:
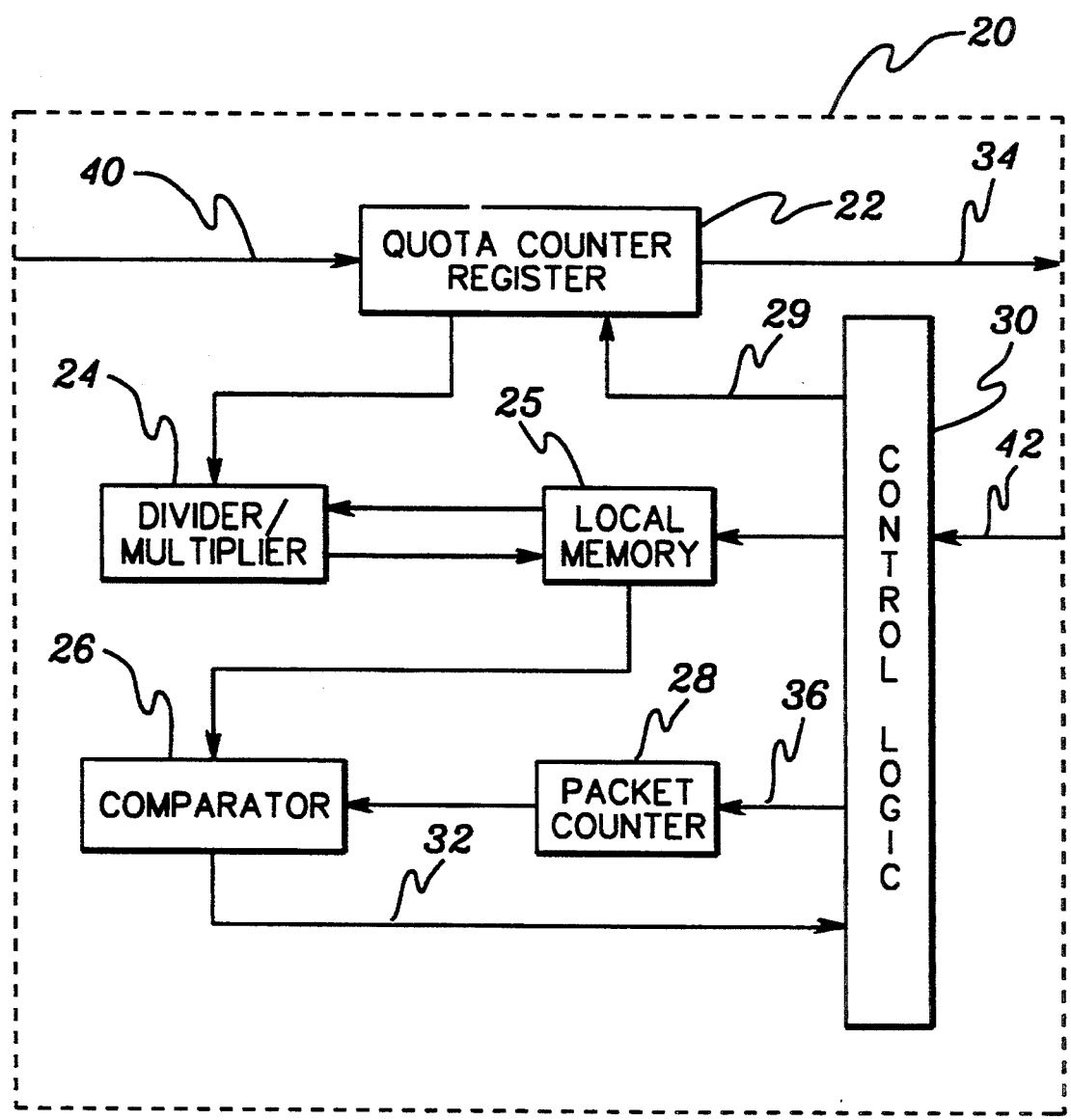
FIG. 4 is a more detailed block diagram of a portion of the bidirectional communication system of FIG. 1 implementing the method of FIG. 2.

A specific example of a multi-node communication system operating in accordance with the above principles will now be described. FIG. 4 depicts, in block diagram form, details of quota allocator 20 in FIG. 1, which includes quota counter register 22, divider/multiplier 24, local memory 25, comparator 26, packet counter 28 and control logic 30. The purpose of the components within and the operation of quota allocator 20 will now be described.

Quota allocator 20 allocates quota in accordance with the equation previously described. Quota counter register 22 holds REQtot and may be loaded, incremented and decremented by control logic 30 over line 29. Divider/multiplier 24 is used to divide Req by REQtot and multiply by Qmax. Local memory 25 holds Req, Qmax and QUOTA once determined. Comparator 26 issues a QuotaActive signal, indicating that the QUOTA for node 12 has not been exhausted, to control logic 30 over line 32 when QUOTA is greater than PktCtr. PktCtr is a binary vector indicating the number of words of quota consumed since the last release of the SAT signal by node 12. Packet counter 28 is cleared by control logic 30 over line 36 when the SAT signal is released by node 12. Packet counter 28 is incremented by logic (not shown) external to quota allocator 20, but within node 12, for each word read from the host buffer (also not shown). For a more detailed explanation of the host buffer, see the Cidon patent.

When node 11 sends REQtot to node 12, Quota counter register 22 is immediately loaded therewith over line 40. The receipt of REQtot at node 12 also triggers a NewQuotaCounter signal to be sent to control logic 30 over line 42 by other circuitry within node 12, the details of which are not pertinent to the present invention and will be understood by those skilled in the art. Control logic 30 responds to the NewQuotaCounter signal by updating REQtot. If the host buffer is nonempty (i.e., if host 14 is requesting nonzero quota) and on the last visit of the REQtot signal to node 12, REQtot was not incremented, REQtot is incremented. If the host buffer is empty, and on the last visit of the REQtot signal to node 12 REQtot was incremented, REQtot is decremented. Under all other circumstances, REQtot is not modified. Thus, in this simplified example, REQtot only changes when the request status of that node has changed from the previous quota determination cycle. After REQtot is updated, REQtot is sent to node 16 over line 34 and link 13.

In the present example, a nonzero quota request is given a value of 1 and a zero quota request is given a value of 0. Thus, REQtot merely indicates the number of nodes with a current nonzero quota request.

Simultaneous with the sending of REQtot to node 16, divider/multiplier 24 will update QUOTA, which is saved in local memory 25. Alternatively, the updating of QUOTA may be postponed until the next visit of the SAT signal to node 12. Still another alternative is updating QUOTA upon sending REQtot only if the determined value for QUOTA is smaller than the stored QUOTA value, and otherwise not updating QUOTA. Comparator 26 continuously compares QUOTA with PktCtr and outputs the QuotaActive signal as long as QUOTA is larger than or equal to PktCtr.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for dynamically determining shared resource access quota in a communication system including a plurality of nodes, comprising:
    circulating a quota request counter among said plurality of nodes, said quota request counter indicating current total node requests for said shared resource access quota; and
    determining a shared resource access quota for a given node as a function of said quota request counter, a quota request of said given node and a total access quota for all of said plurality of nodes.

2. The quota determination method of claim 1 wherein said step of circulating comprises updating said quota request counter to reflect changes in quota requests of said plurality of nodes.

3. The quota determination method of claim 2 wherein said step of updating comprises updating said quota request counter upon arrival thereof at a given node.

4. The quota determination method of claim 2 wherein said step of updating comprises adjusting said quota request counter to reflect a change in a current quota request of said given node from an immediately previous quota request thereof.

5. The quota determination method of claim 4 wherein said step of adjusting comprises subtracting said immediately previous quota request from said quota request counter and adding said current quota request thereto.

6. The quota determination method of claim 2 further comprising storing a current quota request of a given node and storing said updated quota request counter.

7. The quota determination method of claim 1 wherein said step of determining comprises determining said shared resource access quota based on the following formula:

$$QUOTA = Qmax*(Req/REQtot),$$

wherein QUOTA is said shared resource access quota for said given node, Qmax is said total access quota, Req comprises said quota request of said given node, and REQtot is said quota request counter.

8. The quota determination method of claim 7 wherein Req further comprises a priority assigned to said given node.

9. The quota determination method of claim 7 wherein Req=1 if said quota request is nonzero and Req=0 if said quota request is zero, and wherein REQtot indicates a total number of nodes with a current nonzero quota request.

10. The quota determination method of claim 7 wherein QUOTA is determined in response to said quota request counter leaving said given node.

11. A method for dynamically allocating shared resource access quota in a communication system including a plurality of nodes, comprising:
  circulating a quota request counter among said plurality of nodes, said quota request counter indicating current total node requests for said shared resource access quota;
  determining a shared resource access quota for a given node as a function of said quota request counter, a quota request of said given node and a total access quota for all of said plurality of nodes; and
  allocating said determined shared resource access quota to said given node.

12. The quota allocation method of claim 11, wherein said step of allocating comprises:
  circulating a quota allocation signal among said plurality of nodes; and
  allocating said determined shared resource access quota to said given node in response to said quota allocation signal.

13. The quota allocation method of claim 12 wherein said step of determining is performed in response to receipt by said given node of said quota allocation signal and prior to said step of allocating.

14. The quota allocation method of claim 13 wherein said step of allocating comprises allocating said determined shared resource access quota to said given node in response to said quota allocation signal leaving said given node.

15. The quota allocation method of claim 12 wherein said quota allocation signal and said quota request counter are circulated together.

16. A method for dynamically allocating shared resource access quota in a communication system including a plurality of nodes, said method comprising:
  circulating a quota request counter among said plurality of nodes, said quota request counter indicating current total node requests for said shared resource access quota;
  updating said quota request counter upon arrival at a given node to reflect a current quota request thereof;
  storing said updated quota request counter (REQtot);
  storing said current quota request of said given node;
  circulating a quota allocation signal among said plurality of nodes;
  determining a shared resource access quota (QUOTA) for said given node based on the following formula:

$$QUOTA = Qmax*(Req/REQtot),$$

wherein Qmax is a total access quota for all of said plurality of nodes and Req comprises a quota request of said given node; and
  allocating said determined QUOTA to said given node in response to said quota allocation signal.

17. The quota allocation method of claim 16, wherein said step of determining is performed in response to said REQtot leaving said given node, said method further comprising storing said determined QUOTA.

18. The quota allocation method of claim 16 wherein said step of determining is performed in response to receipt by said given node of said quota allocation signal.

19. The quota allocation method of claim 16 wherein said step of allocating is performed in response to said quota allocation signal leaving said given node.

20. The quota allocation method of claim 16, wherein said given node has a prior nonzero QUOTA remaining from an immediately previous visit of said quota allocation signal, said method further comprising the step of exhausting said prior nonzero QUOTA in response to receipt of said quota allocation signal and prior to said step of allocating.

21. The quota allocation method of claim 16 wherein Req further comprises a quota priority assigned to said given node.

22. The quota allocation method of claim 16, wherein Req is zero and said current quota request of said given node is nonzero, and wherein said step of allocating comprises allocating a predetermined minimum quota to said given node.

23. The quota allocation method of claim 16, wherein Req is zero and said current quota request of said given node is nonzero, said step of determining comprising substituting said current quota request for Req in said formula.

24. The quota allocation method of claim 16, wherein Req is zero and said current quota request of said given node is nonzero, said step of determining comprising assigning a predetermined QUOTA to said given node.

25. The quota allocation method of claim 16, wherein Req is zero and said current quota request of said given node is zero, said step of determining comprising assigning a predetermined QUOTA to said given node.

26. The quota allocation method of claim 16, wherein Req is a first nonzero amount and said current quota request of said given node is a second nonzero amount, said step of determining comprising substituting said current quota request for Req in said formula.

27. The quota allocation method of claim 16, wherein Req is a nonzero amount and said current quota request of said given node is zero, said step of determining comprising substituting said current quota request for Req in said formula.

28. A method for dynamically allocating shared resource access quota in a communication system including a plurality of nodes, said method comprising:
  circulating a quota request counter among said plurality of nodes, said quota request counter indicating current total node requests for said shared resource access quota;

updating said quota request counter upon arrival at a given node;

storing said updated quota request counter;

storing a current quota request of said given node;

circulating a quota allocation signal among said plurality of nodes;

determining a shared resource access quota for said given node as a function of said quota request counter, a quota request of said given node and a total access quota for all of said plurality of nodes if said stored quota request is nonzero;

allocating said determined shared resource access quota to said given node in response to said quota allocation signal if said stored quota request is nonzero; and allocating a predetermined shared resource access quota to said given node in response to said quota allocation signal if said stored quota request is zero.

29. The quota allocation method of claim 28 wherein said step of updating comprises updating said quota request counter to reflect a current quota request of said given node if said current quota request is nonzero.

30. The quota allocation method of claim 28 wherein said step of updating comprises updating said quota request counter to reflect a predetermined assigned request if said current quota request is zero.

31. The quota allocation method of claim 28 wherein said step of determining comprises determining said shared resource access quota based on the following formula:

QUOTA=Qmax*(Req/REQtot), wherein QUOTA is said resource access quota for said given node, Qmax is said total access quota, Req comprises said quota request of said given node and REQtot is said quota request counter.

32. Apparatus for determining shared resource access quota in a communication system including a plurality of nodes and a shared resource, said apparatus comprising:

means for circulating a quota request counter among said plurality of nodes, said quota request counter indicating current total node requests for shared resource access quota; and means for determining a shared resource access quota for a given node as a function of said quota request counter, a quota request of said given node and a total access quota for all of said plurality of nodes.

33. A communication system including a plurality of nodes and a shared resource, said communication system comprising:

means for circulating a quota request counter among said plurality of nodes, said quota request counter indicating current total node requests for shared resource access quota;

means for determining a shared resource access quota for a given node as a function of said quota request counter, a quota request of said given node and a total access quota for all of said plurality of nodes; and means for allocating said determined shared resource access quota to said given node.

34. The communication system of claim 33, wherein said allocating means comprises:

means for circulating a quota allocation signal among said plurality of nodes; and means for allocating said determined shared resource access quota to said given node in response to said quota allocation signal.

35. The communication system of claim 33 wherein each of said plurality of nodes comprises means for storing a quota request thereof and said quota request counter.

* * * * *